United States Patent
Rager et al.

(10) Patent No.: US 8,453,787 B2
(45) Date of Patent: Jun. 4, 2013

(54) APEX INTERNAL MOUNTING ARRANGEMENT FOR A V-CONFIGURATION TORQUE ROD

(75) Inventors: Christopher G. Rager, Huron, OH (US); Kenneth A. McGill, Norwalk, OH (US); Joseph F. Cerri, III, Norwalk, OH (US); Russell E. Butler, Milan, OH (US)

(73) Assignee: The Pullman Company, Milan, OH (US)

( * ) Notice: Subject to any disclaimer, the term of this patent is extended or adjusted under 35 U.S.C. 154(b) by 138 days.

(21) Appl. No.: 13/021,797

(22) Filed: Feb. 7, 2011

(65) Prior Publication Data

US 2012/0200056 A1 Aug. 9, 2012

(51) Int. Cl.
*B60G 7/00* (2006.01)
*B60G 9/02* (2006.01)

(52) U.S. Cl.
USPC ............. 180/352; 280/124.156; 280/124.177; 403/132

(58) Field of Classification Search
USPC .................. 280/679, 681, 684, 687, 124.13, 280/124.149, 124.152, 124.156, 124.1, 124.106, 280/124.107, 124.11, 124.116, 124.128, 280/124.177; 180/352, 349, 358, 359; 403/122, 403/131, 132
See application file for complete search history.

(56) References Cited

U.S. PATENT DOCUMENTS

| | | | | |
|---|---|---|---|---|
| 3,750,500 A | * | 8/1973 | Peterson | 81/463 |
| 5,795,092 A | * | 8/1998 | Jaworski et al. | 403/56 |
| 6,270,282 B1 | | 8/2001 | McLaughlin | |
| 7,221,265 B2 | * | 5/2007 | Bjorkgard | 340/440 |
| 7,798,503 B2 | | 9/2010 | McLaughlin et al. | |
| 2005/0271464 A1 | | 12/2005 | Bjorkgard | |
| 2011/0135381 A1 | * | 6/2011 | Wilcutt et al. | 403/122 |
| 2011/0210527 A1 | * | 9/2011 | Elliott et al. | 280/124.11 |

FOREIGN PATENT DOCUMENTS

| | | | |
|---|---|---|---|
| JP | 09024717 A | * | 1/1997 |
| JP | 2001-055029 | | 2/2001 |
| KR | 10 2001 0048446 | | 2/2003 |
| WO | WO 2005116465 A1 | * | 12/2005 |
| WO | WO 2006019309 A1 | * | 2/2006 |
| WO | WO 2006/110049 | | 10/2006 |
| WO | WO 2006110049 A2 | * | 10/2006 |

OTHER PUBLICATIONS

Search Report and Written Opinion dated Aug. 30, 2012 in corresponding PCT Application No. PCT/US2012/021643.

* cited by examiner

*Primary Examiner* — Paul N Dickson
*Assistant Examiner* — Keith Frisby
(74) *Attorney, Agent, or Firm* — Harness, Dickey & Pierce, P.L.C.

(57) ABSTRACT

A V-shaped torque rod includes an apex joint assembly that is attached to a component of a vehicle using only a single fastener. The apex joint assembly includes a housing, an inner metal, an elastomeric member disposed between the housing and the inner metal and a post that engages the inner metal. The single fastener extends through the inner metal and through the post to secure the apex joint assembly to the vehicle. The post can be a tapered post or the post can be a non-tapered post.

18 Claims, 4 Drawing Sheets

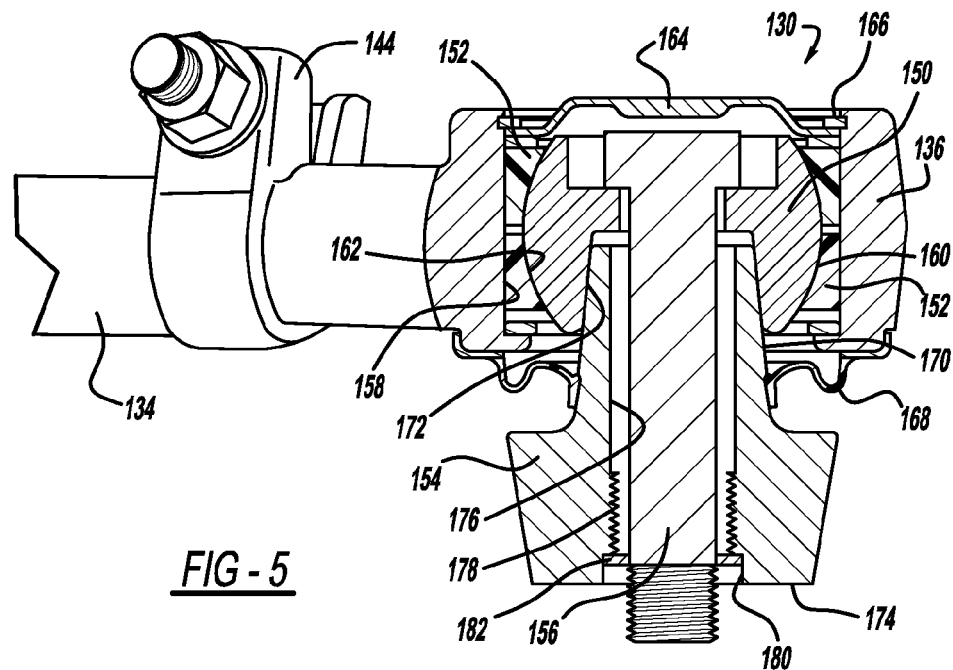
FIG - 5
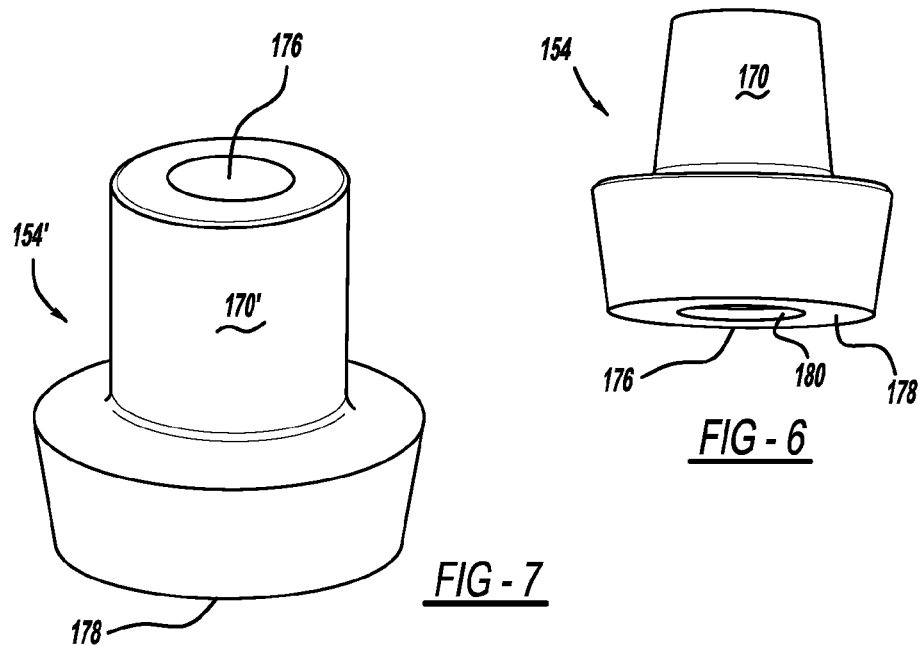
FIG - 7
FIG - 6

APEX INTERNAL MOUNTING ARRANGEMENT FOR A V-CONFIGURATION TORQUE ROD

FIELD

The present disclosure is directed to torque rod assemblies for use in suspension systems for trucks, buses and for other vehicles. More particularly, the present disclosure is directed to an apex internal mounting arrangement for the apex joint assembly of a V-configuration torque rod.

BACKGROUND

This section provides background information related to the present disclosure which is not necessarily prior art.

Truck and bus suspensions, as well as other vehicle suspensions, utilize at least one torque rod to secure the drive axle to the vehicle's frame. The securing of the drive axle to the vehicle's frame by the torque rod maintains the drive axle's alignment to the vehicle's frame, it maintains the proper suspension geometry for the vehicle, and it allows free suspension movements in jounce and rebound for all terrain, road and driving conditions. Because of the wide range of dynamic operating conditions for these vehicles, especially heavy duty trucks, the severe impact loads to the suspension system combined with the road induced vibrations on the suspension system lead to a deleterious effect on the individual suspension components including the torque rods as well as having a negative impact on the operator's physical fatigue condition. These severe dynamic conditions can accelerate wear of the torque rods of the suspension system leading to premature failures of these torque rods.

The purpose of torque rods on large vehicles is to stabilize the axle. They prevent the axle from rotating about its axis; they prevent the axle for moving fore and aft during braking and acceleration; and they prevent axle yaw. While there are a variety of suspension designs, one of two approaches are generally used to stabilize the axle. The first approach uses straight rods with pivotal joints at either end. Two of these straight rods are mounted fore and aft on the vehicle; where one end is mounted to the axle and the other end is mounted to the frame. A third straight rod is similarly mounted laterally in the vehicle, generally perpendicular to the other two. The second approach is a V-configuration torque rod assembly. This type of torque rod has a pivotal joint at the apex of the V as well as at the ends of the legs. The apex is typically mounted to the axle, and the legs are typically mounted to the frame. The V-configuration controls both fore-aft movement as well as lateral movement. The major advantage of the V-configuration rod assembly is axle stability.

A typical prior art single or V-configuration torque rod is comprised of two or three pivotal joint eyelet forgings rigidly connected with tubes to provide the mechanical integrity. The eyelets and tubes form a natural path for shock and vibration energy to transfer from the suspension system into the frame, the cab and other areas of the sprung mass of the vehicle. In order to intercept this path, attempts have been made to incorporate an isolation function into the pivotal joint design. This isolation function thus makes the pivotal joint a critical multi-functional component for the torque rod assembly as well as the suspension system as a whole.

The pivotal joint assembly at the apex of the V-configuration torque rod is attached to the axle in a number of different ways. One example uses a bracket bolted to the axle which includes an integrated solid taper pin which interfaces with the pivotal joint assembly. Another example is a conventional bar pin/straddle pin mount where the bar pin/straddle pin is bolted to a bracket attached to the axle. Both of these attachments require large and relatively expensive brackets which must be attached to the axle using multiple components such as fasteners, washers, stampings and forgings.

SUMMARY

This section provides a general summary of the disclosure, and is not a comprehensive disclosure of its full scope or all of its features.

The present disclosure provides an apex mounting system which utilizes a single through-hole concept that has a fastener that is attached directly to the axle. The concept includes a tapered or press fit post design which interfaces with the pivotal joint of the apex of the V-configuration torque rod. The concept reduces the cost and package space required to secure the V-configuration torque rod to the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a cross-sectional view of the pivotal joint at the apex of the V-configuration torque rod illustrated in FIG. 4;

FIG. 6 is a perspective view of the tapered post illustrated in FIG. 5;

FIG. 7 is a perspective view of a press fit post in accordance with another embodiment of the present disclosure;

Corresponding reference numerals indicate corresponding parts throughout the several views of the drawings.

DETAILED DESCRIPTION

Example embodiments will now be described more fully with reference to the accompanying drawings.

Figures 1, 2:
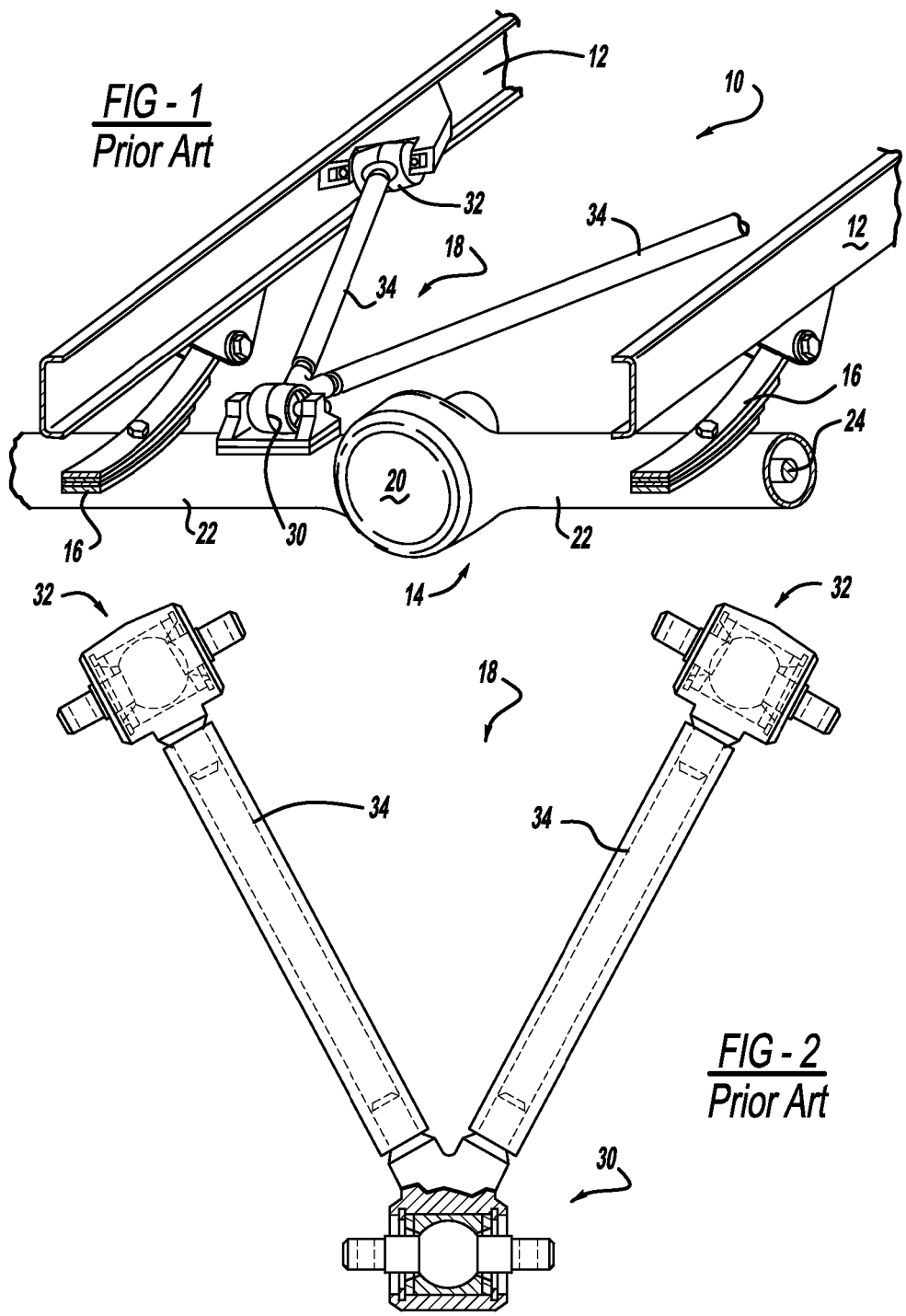
FIG. 1 is a partial perspective view of a prior art vehicle's rear suspension which incorporates a prior art V-configuration torque rod.
FIG. 2 is a plan view, partially in cross-section, illustrating the prior art V-configuration torque rod shown in FIG. 1.

Referring now to the drawings in which like reference numerals designate like or corresponding parts throughout the several views, there is shown in FIG. 1 a prior art vehicle rear suspension indicated generally by the reference numeral 10. Rear suspension 10 comprises a frame 12, a drive axle 14, a pair of springs 16 and a V-configuration torque rod 18. Frame 12 supports a body (not shown) and other components of the vehicle which are termed the sprung mass. Drive axle 14 includes a differential 20 which receives torque from an engine (not shown) through a prop shaft (not shown). Drive axle 14 also includes a pair of hollow tubes 22 that each extend out to a respective wheel assembly (not shown). Disposed within each tube 22 is a drive shaft 24 that extends to a hub (not shown) to which is attached a wheel (not shown). The engine transmits torque to differential 20 though the prop shaft. Differential 20 transfers the torque from the prop shaft to drive shafts 24 to rotate and thus drive the wheels. Springs 16 are disposed between frame 12 and drive axle 14 as is well known in the art. Additionally, a shock absorber (not shown) can be disposed between frame 12 and drive axle 14 to damper the motion between these two components. V-configuration torque rod 18 is also disposed between frame 12 and drive axle 14 to control the motion of drive axle 14 with respect to frame 12.

Referring now to FIG. 2, V-configuration torque rod 18 comprises an apex pivotal joint assembly 30, a pair of end pivotal joint assemblies 32 and a pair of tubes 34. Each tube 34 extends between apex pivotal joint assembly 30 and a respective end pivotal joint assembly 32. Apex pivotal joint assembly 30 and end pivotal joint assemblies 32 are secured to tubes 34 by welding or by other means known well in the art.

Figure 3:
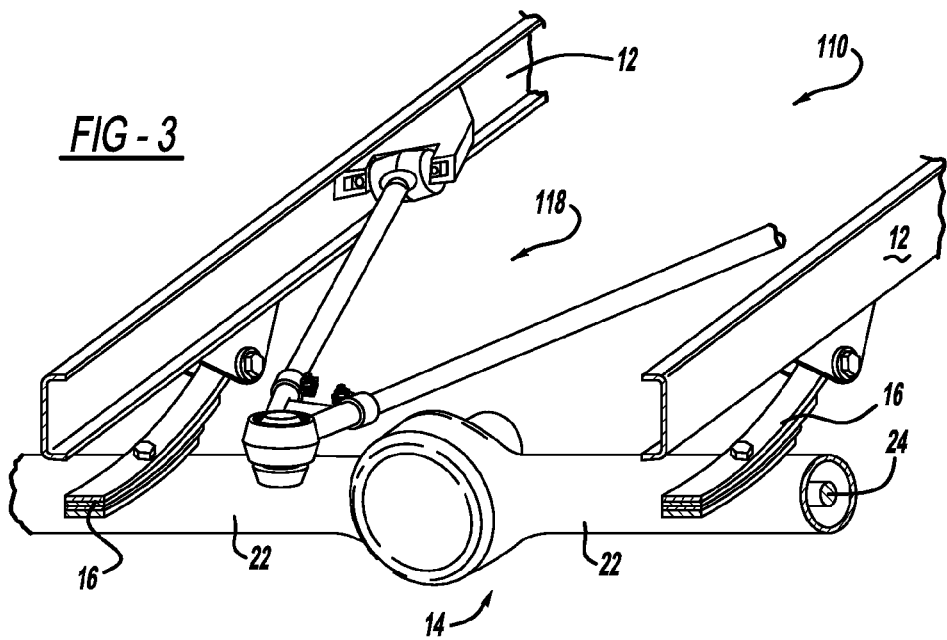
FIG. 3 is a partial perspective of a typical vehicle's rear suspension having a V-configuration torque rod which incorporates the attachment concept in accordance with the present disclosure.

Referring now to FIG. 3, a vehicle rear suspension is illustrated incorporating the torque rod assembly in accordance with the present disclosure and it is designated generally by the reference numeral 110. Rear suspension 110 comprises frame 12, drive axle 14, the pair of springs 16 and a V-configuration torque rod 118. Rear suspension 110 is thus the same as rear suspension 10 but it replaces V-configuration torque rod 18 with V-configuration torque rod 118.

Figure 4:
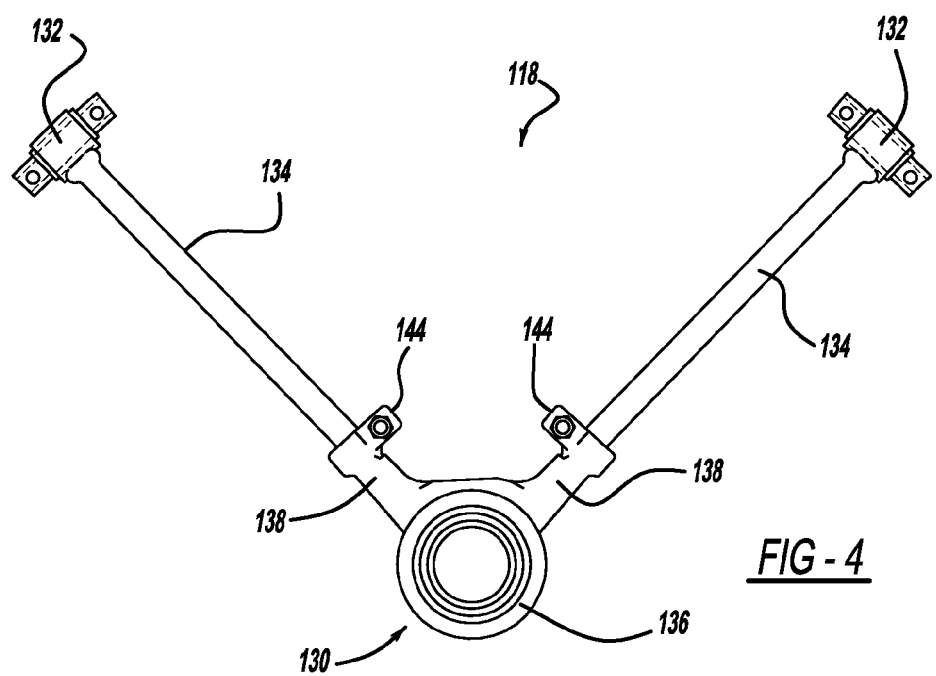
FIG. 4 is a plan view illustrating the V-configuration torque rod in accordance with the present disclosure.

Referring now to FIG. 4, V-configuration torque rod 118 comprises an apex pivotal joint assembly 130, a pair of end pivotal joint assemblies 132 and a pair of solid bars 134. Each solid bar 134 extends between cast apex pivotal joint assembly 130 and a respective end pivotal joint assembly 132. End pivotal joint assemblies 132 are secured to solid bars 134 by welding or by other means known in the art. Apex pivotal joint assembly 130 is secured to solid bars 134 using a threaded connection. While FIG. 4 illustrates V-configuration torque rod 118 as comprising solid bars 134, welded connections between solid bars 134 and end pivotal joint assemblies 132 and threaded connections between solid bars 134 and apex pivotal joint assembly 130, it is within the scope of the present disclosure to use tubular bars in place of solid bars 134, the bars can be welded to apex pivotal joint assembly 130 and a length adjustment mechanism can be incorporated into solid or tubular bars 134 or incorporated into the connections at either end of solid or tubular bars 134.

As shown in FIG. 4, apex pivotal joint assembly 130 is assembled into a V-shaped cast or forged housing 136 which includes a pair of angular tubular rod extensions 138 which are angled at an angle which is specific to each vehicle application. Each tubular rod extension 138 defines a threaded bore which is designed to threadingly accept a threaded end of solid bar 134. A clamp 144 is integral with tubular rod extension 138 and it is designed to clamp a portion of solid bar 134 using a bolt and a nut once the proper length between apex pivotal joint assembly 130 and end pivotal joint assembly 132 is set. While clamp 144 is illustrated as being integral with tubular rod extension 138, it is within the scope of the present invention to have clamp 144 as a separate component which is then assembled to tubular rod extension 138.

Referring now to FIGS. 5 and 6, apex pivotal joint assembly 130 is illustrated in greater detail. Apex pivotal joint assembly 130 comprises V-shaped cast or forged housing 136, an inner metal 150, a pair of annular elastomeric bushings 152, a tapered post 154 and a fastener 156. Inner metal 150 is disposed within a bore 158 defined by V-shaped housing 136. The pair of annular elastomeric bushings 152 are disposed between inner metal 150 and V-shaped housing 136. An outer surface 160 of inner metal 150 is curved and outer surface 160 mates with an inner curved surface 162 formed by the pair of annular elastomeric bushings 152. An end cap 164 seals the cavity defined by bore 158. A snap ring 166 retains end cap 164 in position with respect to V-shaped housing 136. An elastomeric seal assembly 168 extends between V-shaped housing 136 and tapered post 154 to seal the end of bore 158 opposite to end cap 164.

Tapered post 154 defines a tapered surface 170 which engages a tapered surface 172 defined by inner metal 150. Tapered post 154 also defines a bearing surface 174 which is designed to engage drive axle 14 and a hole 176 extending through tapered post to accommodate fastener 156. As illustrated in FIG. 5, hole 176 includes a reduced diameter section 178 which defines threads larger than fastener 156 and which are a feature provided for serviceability. A counterbore 180 extends into tapered post 154 and counterbore 180 is designed to accept a mating boss formed on drive axle 14. A hardened washer 182 is glued or otherwise secured within counterbore 180 for handling, transport and servicing for V-configuration torque rod 18. During the removal of V-configuration torque rod 18 from drive axle 14, a removal tool is threaded into the threaded portion of reduced diameter section 178. The removal tool will engage hardened washer 182 which will then engage the softer casting material of drive axle 14 to facilitate the removal of V-configuration torque rod 18.

During the assembly of V-configuration torque rod 18 to rear suspension 10, counterbore 180 engages the mating boss on drive axle 14 which aligns hole 176 with a threaded hole (not shown) in drive axle 14 and fastener 156 is inserted into hole 176 to threadingly engage the threaded hole in drive axle 14. Fastener 156 is tightened to a specific torque value. The tightening of fastener 156 generates a clamping load which will induce compressive stresses throughout the clamped components which will increase strength and fatigue life of the components. Once fastener 156 is torqued to its specification, end cap 164 is placed in position and snap ring 166 is assembled to V-shaped housing 136 to retain end cap 164. As disclosed in FIG. 5, fastener 156 is a single bolt.

Referring to FIG. 7, a non-tapered generally cylindrical post 154' is illustrated. Non-tapered post 154' defines a non-tapered surface 170' and non-tapered post 154' is a direct replacement for tapered post 154. When using non-tapered post 154', tapered surface 172 defined by inner metal 150 will become a non-tapered surface which is designed to be in a press fit relationship with non-tapered surface 170' defined by non-tapered post 154'. The above discussion regarding tapered post 154 applies to non-tapered post 154' also.

Figure 8:
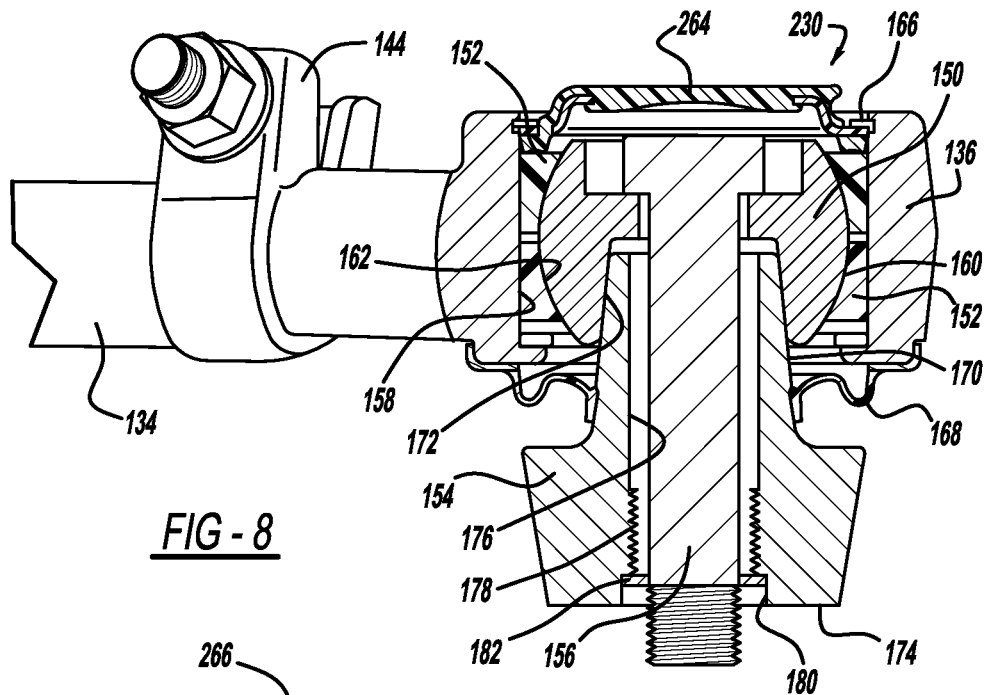
FIG. 8 is a cross-sectional view of a pivotal joint at the apex of the V-configuration torque rod illustrated in FIG. 4 which incorporates an end cap assembly in accordance with another embodiment of the present disclosure.
Figure 9:
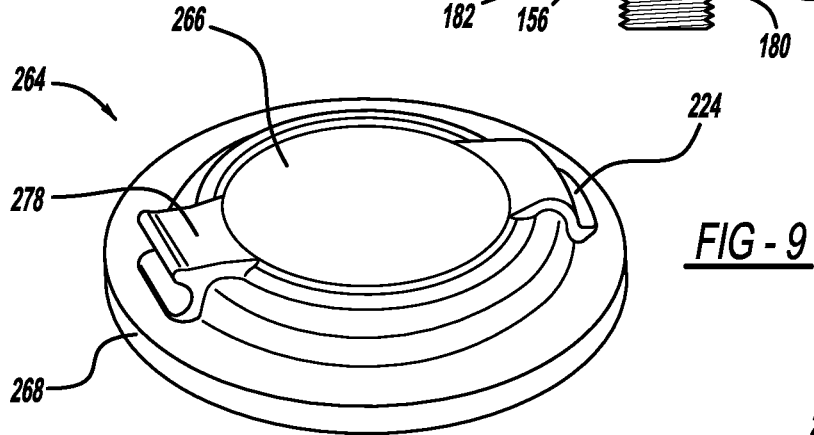
FIG. 9 is a perspective view of the end cap assembly illustrated in FIG. 8.
Figure 10:
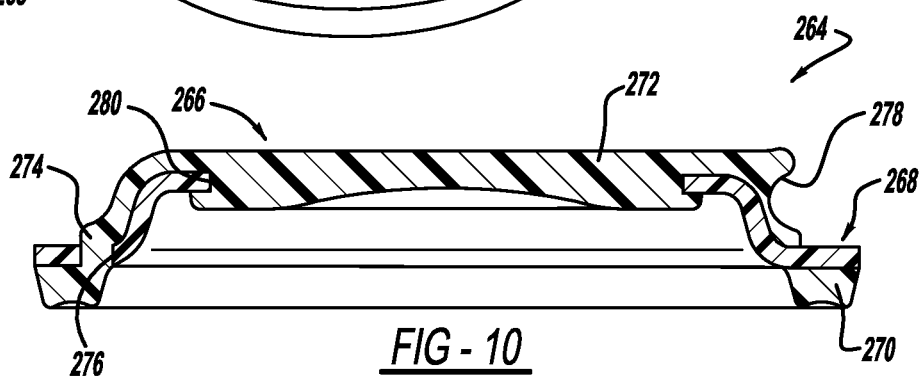
FIG. 10 is a side cross-sectional view through the end cap assembly illustrated in FIGS. 8 and 9.

Referring now to FIGS. 8-10, a portion of an apex joint assembly 230 is illustrated. Apex joint assembly 230 is the same as apex pivotal joint assembly 130 except that end cap 164 has been replaced with the end cap assembly 264. The remainder of apex pivotal joint assembly 230 is identical to apex pivotal joint assembly 130 and the description above of apex pivotal joint assembly 130 also applies to apex pivotal joint assembly 230. End cap assembly 264 is attached to V-shaped housing 136 using snap ring 166 the same way as end cap 164.

End cap assembly 264 comprises a top integrated seal 266 bonded to an annular lower component 268. Top integrated seal 266 is a metal, plastic or elastomeric material that includes a bottom bonded cushion 270 and a top seal component 272. A tether 274 extends from bottom bonded cushion 270 to top seal component 272 through a slot 276 formed into annular lower component 268. Top seal component 272 includes a pull tab 278 to facilitate the opening and closing of end cap assembly 264 as described below.

Annular lower component 268 is an elastomeric, metal or rubber component that is bonded to bottom bonded cushion 270. Annular lower component 268 is an S-shaped component that has one end bonded to bottom bonded cushion 270 of top integrated seal 266 and that has the opposite end disposed in an annular groove 280 defined by top seal component 272 of top integrated seal 266.

When end cap assembly 264 is in its closed position as illustrated in FIGS. 8-10, end cap assembly 264 can be moved to its open position by utilizing pull tab 278 to move top seal component 272 away from bottom bonded cushion 270 and disengage the end of annular lower component 268 from annular groove 280. This allows top seal component 272 to pivot with respect to tether 274 to allow access to fastener 156. Once fastener 156 has been assembled or disassembled to drive axle 14, end cap assembly 264 can be moved to its closed position.

To move to its closed position, top seal component 272 is moved toward the open end of annular lower component 268. By applying pressure to top seal component 272, top seal component 272 and annular lower component 268 will deflect allowing the end of annular lower component 268 to once again engage annular groove 280.

End cap assembly 264 seals the bore 158 defined by V-shaped housing 136. A first seal is provided at the outside diameter of end cap assembly 264 by bottom bonded cushion 270. A second seal is provided at the engagement between annular lower component 268 and annular groove 280. The area between the first and second seal is sealed by top integrated seal 266 being bonded to annular lower component 268.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A torque rod assembly in combination with an axle assembly, the combination comprising:
    a first end joint assembly;
    a first rod attached to said first end joint assembly;
    a second end joint assembly;
    a second rod attached to said second end joint assembly;
    an apex joint assembly attached to said first rod and to said second rod;
    said apex joint assembly comprising:
        a housing attached to said first and second rods;
        an inner metal;
        an elastomeric member disposed between said housing and said inner metal;
        a post engaging said inner metal; and
        a fastener extending entirely through a first bore defined by said inner metal and entirely through a second bore defined by said post, said fastener defines a threaded shaft threadingly engaging a threaded bore defined by said axle assembly.

2. The combination according to claim 1, wherein said second bore defines a threaded section at an end of said second bore immediately adjacent said axle assembly, said fastener extending through said threaded section without threadingly engaging said threaded section.

3. The combination according to claim 1, wherein said post is a tapered post, said tapered post defining a tapered surface engaging a tapered bore defined by said inner metal.

4. The combination according to claim 1, wherein said post is a non-tapered post, said non-tapered post being in a press fit relationship with a bore defined by said inner metal.

5. The combination according to claim 1, wherein:
    said housing defines a bore;
    said inner metal, said elastomeric member, said post and said fastener are disposed within said bore defined by said housing; and
    said apex joint assembly further comprises an end cap closing a first end of said bore.

6. The combination according to claim 5, wherein said apex joint assembly further comprises a seal assembly closing a second end of said bore.

7. The combination according to claim 6, wherein said seal assembly is disposed between said housing and said post.

8. The combination according to claim 1, wherein said elastomeric member comprises a pair of elastomeric bushings.

9. The combination according to claim 1, wherein said fastener is adapted to threadingly engage a component of a vehicle.

10. The combination according to claim 1, wherein said inner metal defines a spherical surface directly engaging a spherical surface defined by said elastomeric member.

11. The combination according to claim 1, wherein said fastener is a single bolt.

12. A torque rod assembly comprising:
    a first end joint assembly;
    a first rod attached to said first end joint assembly;
    a second end joint assembly;
    a second rod attached to said second end joint assembly;
    an apex joint assembly attached to said first rod and to said second rod;
    said apex joint assembly comprising:
        a housing attached to said first and second rods;
        an inner metal;
        an elastomeric member disposed between said housing and said inner metal;
        a post engaging said inner metal;
        a fastener extending through a first bore defined by said inner metal and a second bore defined by said post;
        an end cap closing a first end of a bore in said housing, said end cap comprising:
            a bottom cushion; and
            a top seal attached to said bottom cushion.

13. The torque rod assembly according to claim 12, wherein said bottom cushion is bonded to said top seal.

14. The torque rod assembly according to claim 12, further comprising a tether pivotably attaching said top seal to said bottom cushion.

15. The torque rod assembly according to claim 14, wherein said bottom cushion is bonded to said top seal.

16. The torque rod assembly according to claim 12, wherein said bottom cushion engages a groove defined by said top seal.

17. The torque rod assembly according to claim 16, wherein said bottom cushion is bonded to said top seal.

18. The torque rod assembly according to claim 17, further comprising a tether pivotably attaching said top seal to said bottom cushion.

* * * * *